United States Patent
Chomik et al.

(10) Patent No.: US 7,114,534 B2
(45) Date of Patent: *Oct. 3, 2006

(54) COMPOSITE TRASH CONTAINER

(75) Inventors: Richard S. Chomik, Orlando, FL (US); Mark Yoho, Chagrin Falls, OH (US)

(73) Assignee: Playtex Products, Inc., Westport, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/020,454

(22) Filed: Dec. 23, 2004

(65) Prior Publication Data

US 2005/0103499 A1    May 19, 2005

Related U.S. Application Data

(63) Continuation of application No. 10/418,899, filed on Apr. 17, 2003, now Pat. No. 6,901,974.

(60) Provisional application No. 60/373,143, filed on Apr. 17, 2002.

(51) Int. Cl.
*B65B 3/16* (2006.01)

(52) U.S. Cl. .................. 141/114; 141/314; 141/316; 53/567; 53/576

(58) Field of Classification Search .................. 141/10, 141/18, 71, 100, 105–107, 114, 314, 316, 141/317, 325, 326, 327; 53/467–469, 567, 53/570, 574–576; 220/495.05–495.08
See application file for complete search history.

(56) References Cited

U.S. PATENT DOCUMENTS

| | | |
|---|---|---|
| 2,411,430 A | 11/1946 | Hodson |
| 3,536,192 A | 10/1970 | Couper |
| 3,579,416 A | 5/1971 | Schrenk |
| 3,655,129 A | 4/1972 | Seiner |
| 3,741,253 A | 6/1973 | Brax et al. |
| 3,762,454 A | 10/1973 | Wilkins, Jr. |
| 4,101,711 A | 7/1978 | Stillman |
| 4,254,169 A | 3/1981 | Schroeder |
| 4,254,179 A | 3/1981 | Carson, III et al. |
| 4,284,444 A | 8/1981 | Bernstein et al. |
| 4,351,876 A | 9/1982 | Doi et al. |
| 4,612,221 A | 9/1986 | Biel et al. |
| 4,660,758 A | 4/1987 | Tavel et al. |

(Continued)

FOREIGN PATENT DOCUMENTS

| | | |
|---|---|---|
| CA | 2019173 | 12/1990 |

(Continued)

OTHER PUBLICATIONS

International Search Report PCT/US03/11978/ dated Mar. 12, 2004.

*Primary Examiner*—Timothy L. Maust
(74) *Attorney, Agent, or Firm*—Ohlandt, Greeley, Ruggiero & Perle, L.L.P.

(57) ABSTRACT

The present invention is a composite trash container that includes a container body defining a trash chamber and an opening that provides access to the trash chamber; a support mounted to the container body adjacent the opening, the support having a flange extending therefrom that is configured for rotational mounting a tubing cassette above the trash chamber, wherein the support encloses less than all of the opening to the trash chamber so that trash can be passed through the opening and into the trash chamber; a tubing cassette rotationally mounted to the flange of the support; and a tube sealing means for forming trash packets from tubing that is dispensed from the tubing cassette.

20 Claims, 5 Drawing Sheets

U.S. PATENT DOCUMENTS

| | | |
|---|---|---|
| 4,705,707 A | 11/1987 | Winter |
| 4,716,061 A | 12/1987 | Winter |
| 4,865,371 A | 9/1989 | Egberg |
| 4,869,049 A | 9/1989 | Richards et al. |
| 4,893,722 A | 1/1990 | Jones |
| 4,898,633 A | 2/1990 | Doree et al. |
| 4,934,529 A | 6/1990 | Richards et al. |
| 4,974,746 A | 12/1990 | Dickinson |
| 5,022,553 A | 6/1991 | Pontius |
| 5,031,793 A | 7/1991 | Chen et al. |
| 5,056,293 A | 10/1991 | Richards et al. |
| 5,129,735 A | 7/1992 | Neal et al. |
| 5,147,055 A | 9/1992 | Samson et al. |
| 5,158,199 A | 10/1992 | Pontius |
| 5,174,462 A | 12/1992 | Hames |
| 5,238,301 A | 8/1993 | Brady |
| 5,294,017 A | 3/1994 | Li |
| 5,303,841 A | 4/1994 | Mezey |
| 5,520,303 A * | 5/1996 | Bernstein et al. ...... 220/495.08 |
| 5,534,105 A | 7/1996 | Boyd |
| 5,535,913 A | 7/1996 | Asbach et al. |
| 5,590,512 A | 1/1997 | Richards et al. |
| 5,640,931 A | 6/1997 | Markham |
| 5,655,680 A * | 8/1997 | Asbach et al. ......... 220/495.11 |
| 5,659,933 A | 8/1997 | McWilliams |
| 5,813,200 A | 9/1998 | Jacoby et al. |
| 5,860,959 A | 1/1999 | Gent |
| 5,938,305 A | 8/1999 | Rubsam-Tomlinson |
| 6,047,843 A | 4/2000 | Mecke |
| 6,065,272 A | 5/2000 | Lecomte |
| 6,128,890 A | 10/2000 | Firth |
| 6,129,716 A | 10/2000 | Steer |
| 6,141,945 A | 11/2000 | Becher |
| 6,150,004 A | 11/2000 | Oikawa et al. |
| 6,170,240 B1 | 1/2001 | Jacoby et al. |
| 6,202,877 B1 | 3/2001 | La Torre et al. |
| 6,258,423 B1 | 7/2001 | Giori |
| 6,370,847 B1 | 4/2002 | Jensen et al. |
| 6,516,588 B1 | 2/2003 | Jensen et al. |
| 2002/0162304 A1 | 11/2002 | Stravitz |

FOREIGN PATENT DOCUMENTS

| | | |
|---|---|---|
| CA | 1298191 | 3/1992 |
| CA | 1318234 | 5/1993 |
| FR | 0005660 | 11/1979 |
| WO | WO 02/051788 | 7/2002 |

* cited by examiner

COMPOSITE TRASH CONTAINER

RELATED APPLICATION

This application is a continuation of U.S. patent application Ser. No. 10/418,899, now U.S. Pat. No. 6,901,974, filed Apr. 17, 2003, which claims the benefit of U.S. Provisional Application Ser. No. 60/373,143 filed on Apr. 17, 2002. The contents of the above-cited applications are incorporated by reference herein in their entirety.

BACKGROUND OF THE INVENTION

1. Field of the Invention

The present invention relates generally to a composite trash container and, more particularly, to a composite trash container in which odoriferous and non-odoriferous trash may be separately contained.

2. Description of the Related Art

Many items in life are associated with smells generally found to be unpleasant. The fact is that the disposal of these items in everyday living can be a hassle. As an example, certain foods, such as meat and fish, generate smells once placed in a kitchen trash receptacle, often requiring the receptacle to be emptied long before it is completely filled. In addition, babies will generate a significant number of soiled diapers that, due to the smell, require frequent trips to an outside trash can. Similarly, pets such as cats generate considerable amounts of soiled litter that require more frequent trips to the outside trash than otherwise would be necessary. Because trips to an outside receptacle are not always convenient (such as when it is dark or there is inclement weather), people have resorted to various devices to decrease the odors that emanate from their household trash.

An example of a device used to decrease odors that emanate from household trash is disclosed in European Patent Application No. 0005660. The device is used to dispose of kitchen trash in sealed trash packets formed from flexible tubing. The tubing is stored in a pack of tubing that surrounds a tubular guide. The tubing is pulled from the top of the pack of tubing, and fed through the tubular guide to a position beneath the tubular guide where it is sealed by fusion with a tube-sealing mechanism. When the section of tubing above the fused area is full of trash, a lever is operated to actuate the tube-sealing mechanism. The tube-sealing mechanism is configured to draw the tubing downward, fuse the tubing together above the trash packet, seal the tubing together again above the previously fused area to provide a base for the next trash packet, and cut the tubing at a location between the two fused areas to separate the filled trash packet from the tubing.

Another example of a device used to decrease odors that emanate from household trash is disclosed in U.S. Pat. Nos. 6,370,847 and 6,516,588, both issued to Jensen, et al. These related patents disclose a sealable diaper-disposal system that includes a container body, a tubular core on which flexible tubing is stored, and a tube-sealing mechanism having a pair of heating elements. The flexible tubing is pulled from the tubular core and passed between the pair of heating elements. The tube-sealing mechanism operates to move the pair of heating elements toward each other to fuse the width of the tubing, and away from each other to allow the tubing to be pushed into the lower portion of the container body.

Yet another example of a device used to decrease odors that emanate from household trash is disclosed in U.S. Pat. No. 5,813,200 to Jacoby, et al. This device also includes a tube-sealing mechanism, though "sealing" (e.g., closing off the tubing at a point in the length in the tubing) is obtained by putting twists in the tubing instead of fusing the tubing. The device has a container body with a hinged base, a hinged lid, and a channel-shaped flange mounted within the container body. A tubing cassette rests on the channel-shaped flange. Springs are fixed to the channel-shaped flange and project radially inward to engage a trash packet formed from the tube. The springs are equally spaced around the interior of the container to hold the package during the forming of a twist in the tube. When a tubing cassette is first installed, the open end of the tube is tied to form the bottom of a first trash packet. Trash is then inserted into the first trash packet and rests within the tubing near the knot. Once the first trash packet is filled, the tubing cassette is rotated so that the tubing stored therein rotates with respect to the trash packet that is being formed. The trash packet being formed does not rotate because it is held in place by friction between the first trash packet and the springs. Thus, a first trash packet is formed between the knot and a first twist in the tubing. Subsequently, objects are disposed and twisted in a like manner to form discrete trash packets with twists between them.

Of course, not all household trash is odoriferous. When household trash is non-odoriferous it is unnecessary to seal it in trash packets formed from tubular bags as described above. In addition, tubular trash bags tend to be more expensive than standard polymeric trash bags, therefore, it is uneconomical to use tubular trash bags to discard non-odoriferous household trash. Furthermore, because tube-sealing devices take some degree of time and effort to operate, using such devices to dispose of non-odoriferous household trash is inefficient. It would be useful if a device were available that efficiently and effectively includes receptacles for containing both odoriferous and non-odoriferous household trash.

Prior art devices have been disclosed that include multiple receptacles for containing different types of trash. Such devices, however, are primarily concerned with separating recyclable trash such as aluminum cans, plastic bottles, and newspapers. U.S. Pat. No. 4,660,758 to Tavel, et al., discloses a waste separator-receptacle including several drawer-type compartments that tilt outward to open for holding different types of recyclable materials. The device also includes a vertically oriented compartment in which newspapers are discarded. Aerosol dispensers are provided for deodorizing the recyclable materials. U.S. Pat. No. 6,047843 to Mecke discloses a compartmented receptacle for use in recycling and waste disposal. The device has a cylindrically-shaped housing for storing several wedge-shaped containers in which recyclable materials are discarded. Each container is accessed though openings in a lid mounted atop the housing. U.S. Pat. No. 4,893,722 to Jones discloses a compartmented waste receptacle for discarding recyclable materials. The waste receptacle includes two lower compartments having tubular chutes extending vertically upward therefrom. The tubular chutes includes gaskets for limiting the speed that the deposited recyclable materials may travel, thereby preventing glass breakage. U.S. Pat. No. 5,238,301 to Brady discloses a vertical unitized compartmentalized separation/holding container which includes several compartments having hinged doors that open from the front. Within each compartment are retainer hooks for retaining bags in each compartment.

There are still other prior art devices primarily concerned with separating recyclable trash, though these are of a more industrial nature. For example, U.S. Pat. No. 5,303,841 to Mezey discloses a container that is used for the segregation of recyclable materials. The container is intended to be used with a vehicle for the orderly collection of such recyclable materials. U.S. Pat. No. 6,141,945 to Becher discloses an automatic compacting, packaging, and disposal machine for recyclable materials.

Other prior art devices have been disclosed that include multiple receptacles to contain different types of trash. These devices, however, are primarily concerned with facilitating the attachment or supply of plastic bags. For example, U.S. Pat. No. 4,974,746 to Dickinson discloses a waste separation container including flexible lobes extending along the upper edge of the receptacle that allow a user to selectively locate trash bags within the container. U.S. Pat. No. 5,294,017 to Li discloses a recycle and refuse container with a continuous supply of bags. The device includes a refuse container that may be divided into two sections, a trash bag housing for supporting two rolls of trash bags, and a base. The trash bags are fed from the rolls, through the bottom of the refuse container and draped over the sides of the container. When a trash bag is filled with trash, the bag can be pulled up and removed.

Still other prior art devices have been disclosed that include multiple receptacles to contain different types of trash. Although these devices are concerned with the separation of "wet garbage" and "dry garbage," such devices do not adequately isolate the wet garbage to satisfactorily eliminate the odor emanating therefrom, nor do they provide for a convenient way to remove the garbage from the device. For example, U.S. Pat. No. 5,938,305 to Rubsam-Tomlinson discloses a compost and dry storage enclosure device that is intended to be installed in a kitchen cabinet. The device includes a first container for the storage of material containing a high level of moisture ("wet garbage") for use in a compost mixture. The first container further includes a removable cover to form a removable fluid-tight seal to contain the moisture and odor of the stored material. The device also includes a second container configured for receiving and storing material containing a low level of moisture ("dry garbage").

From the above it can be appreciated by those of ordinary skill in the art that there presently are no devices that solve the problems confronted by individuals that desire to conveniently separate odoriferous and non-odoriferous household trash. That is, although there are devices in the prior art for sealingly packaging odoriferous trash, these devices are inadequate for non-odoriferous trash because the bags that are used in such devices are more expensive than standard polymeric trash bags and the devices are comparatively more time-consuming to operate. Furthermore, although there are numerous devices in the prior art for separating recyclable materials, these devices are also inadequate since these devices do not sufficiently contain odors that emanate from odoriferous trash. The contents of all of the prior art references cited herein are incorporated by reference.

SUMMARY OF THE INVENTION

One aspect of the present invention is a composite trash container including a container body defining a trash chamber and an opening that provides access to the trash chamber; a support mounted to the container body adjacent the opening, the support having a flange extending therefrom that is configured for mounting a tubing cassette above the trash chamber, wherein the support encloses less than all of the opening to the trash chamber so that trash can be passed through the opening and into the trash chamber; a tubing cassette mounted to the flange of the support; and a tube sealing means for forming trash packets from tubing that is dispensed from the tubing cassette. A trash bag may be mounted in the trash chamber so that trash packets will collect therein as they are formed. The flange may be configured so the tubing cassette can be rotated by hand to create a twist in the tubing when forming a trash packet.

The composite trash container may include a partition mounted to the container body within the trash chamber for dividing the trash chamber into a first trash chamber and a second trash chamber. The support may then position the tubing cassette above the second trash chamber so that trash packets will collect in the second trash chamber as they are formed.

The composite trash container may also include a drive plate mounted to the tubing cassette, a drive gear drivingly engaged with the drive plate, and a motor mounted to the composite trash container and having an output shaft that rotates the drive gear when the motor is activated. A timing circuit may be employed for activating the motor to rotate the tubing cassette one of a predetermined amount of time or a predetermined number of times. A manually operated switch may be used for activating the motor.

A lid may be hingedly attached to the container body for enclosing the opening to the trash chamber. In addition, the hinge may include a latching mechanism or a biasing means to retain the lid in an open position. A foot pedal assembly may be attached to the lid for opening the lid. Such assemblies are well known to those of ordinary skill in the art.

Another aspect of the present invention is a composite trash container including a container body defining a trash chamber and an opening that provides access to the trash chamber; a support mounted to the container body adjacent the opening, the support having a flange extending therefrom that is configured for rotational mounting of a tubing cassette above the trash chamber, wherein the support encloses less than all of the opening to the trash chamber so that trash can be passed through the opening and into the trash chamber; a tubing cassette rotationally mounted to the flange of the support; and a retention means for preventing rotation of a trash packet when the tubing cassette is rotated to create a twist in the tubing.

Yet another aspect of the present invention is a composite trash container including a container body defining a trash chamber and an opening that provides access to the trash chamber; a support mounted to the container body adjacent the opening and configured to enclose less than all of the opening to the trash chamber so that trash can be passed through the opening and into the trash chamber; a tubing cassette rotationally mounted to the support above the trash chamber; and a retention means for preventing rotation of a trash packet when the tubing cassette is rotated to create a twist in the tubing.

These and other aspects of the invention are disclosed in more detail herein below.

BRIEF DESCRIPTION OF THE FIGURES

A more complete appreciation of the invention and the advantages thereof will be more readily apparent by reference to the detailed description of the preferred embodiments when considered in connection with the accompanying figures, wherein.

It is notable that like items depicted in different figures may be referred to by the same reference numbers.

DETAILED DESCRIPTION OF THE PREFERRED EMBODIMENTS

The present invention provides a device for the convenient and economical disposal of odoriferous and non-odoriferous household trash. An embodiment of the invention includes a first receptacle for use in discarding non-odoriferous trash such as plastic flatware, paper plates, package wrappings, etc., and a second receptacle for use in discarding odoriferous trash such as dinner plate scrapings, vegetable and fruit cuttings, dated leftovers, etc. Another embodiment includes a single receptacle in which both non-odoriferous and odoriferous trash are discarded. These embodiment and still further embodiments are disclosed in detail herein below. Those of ordinary skill in the art will appreciate that various changes, substitutions, and alterations can be made without departing from the spirit and scope of the invention as described herein and defined by the appended claims.

Figure 1:
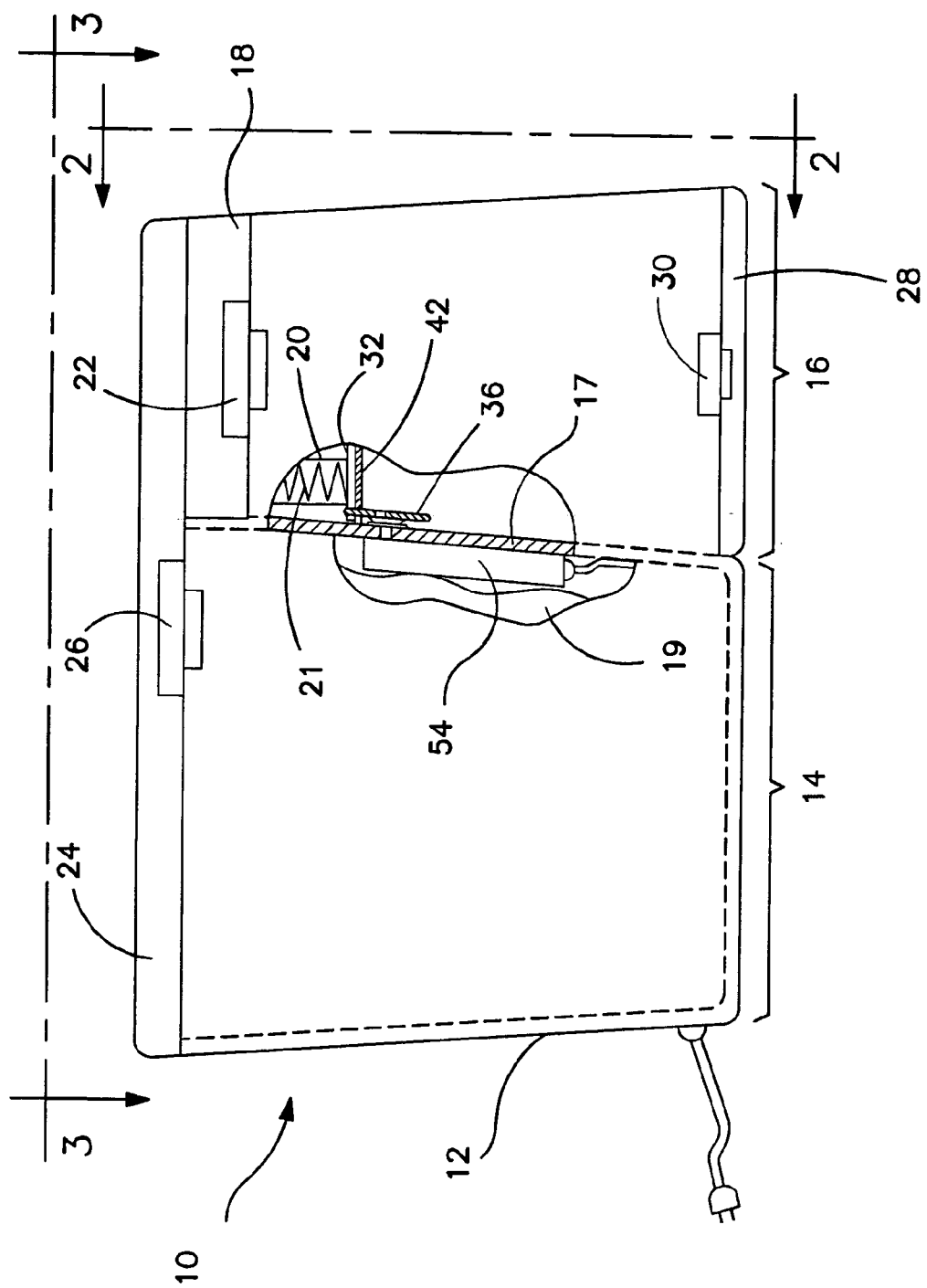
FIG. 1 is a sectioned front elevation view of an embodiment of the present invention.

Referring to FIG. 1, a composite trash container 10 is shown. The composite trash container 10 includes a container body 12 which defines a first trash receptacle 14 (for non-odoriferous trash) and a second trash receptacle 16 (for odoriferous trash). A partition 17 separates the two receptacles. The first trash receptacle 14 is tapered outward from its lower end to its upper end so trash bags 19 may easily slide into and out of the receptacle 14. This is particularly advantageous when a trash bag 19 is stuffed full of trash. The second trash receptacle 16 incorporates a tube-sealing means, which may be any of a number of tube-sealing devices used to seal off tubing sections into trash packets to isolate odors emanating from odoriferous trash.

For the purpose of this invention, any device that closes off tubing at a point along the length of the tubing is considered a "tube-sealing means." Therefore, for example, fusion devices, which close off tubing with heating elements, and twisting devices, which close off tubing by inducing a twist, are considered "tube-sealing means." Several tube-sealing means are disclosed herein above in the background of the invention. Other exemplary tube-sealing means are disclosed in U.S. Pat. Nos. 6,128,890, and 6,065,272, and U.S. Publication No. US 2002/0162304, the contents of all of which are incorporated by reference herein. In this description and the accompanying figures, reference is only made to a tube-twisting mechanism for closing off tubing.

Figure 2:
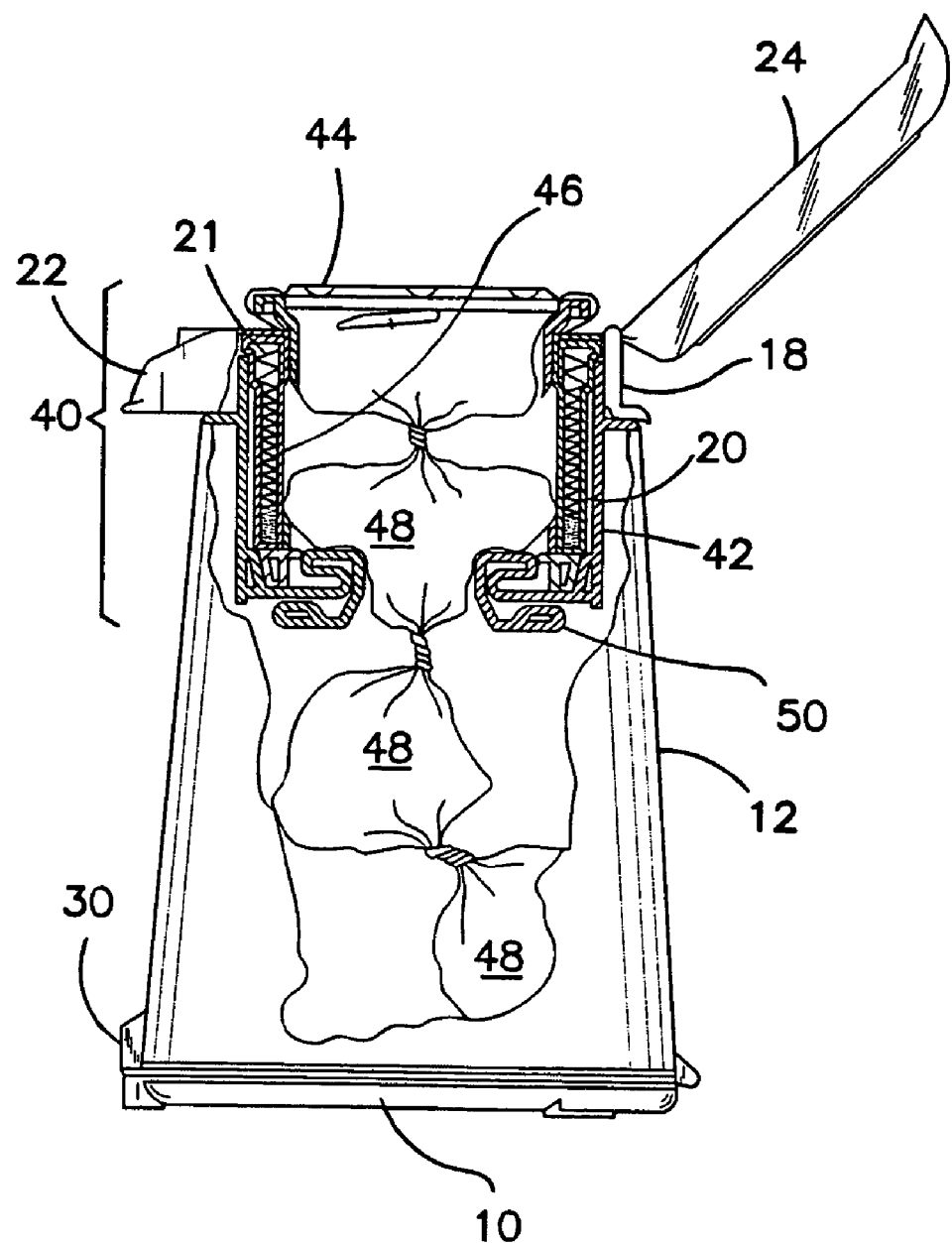
FIG. 2 is a sectioned side elevation view of the embodiment of the present invention as shown in FIG. 1.

Referring to FIGS. 1 and 2, the second trash receptacle 16 also includes an inner lid 18 for enclosing a tubing cassette 20 within the second trash receptacle 16. The tubing cassette 20 houses a length of tubing material 21 for use in the second trash receptacle 16. The inner lid 18 includes a latch 22 for securing the inner lid 18 in a closed position. A hinged lid 24 is mounted to the container body 12 for closing off access to the interiors of each trash receptacle 14 and 16. The hinged lid 24 includes a latch 26 for securing the hinged lid 24 in a closed position. The second trash receptacle 16 also includes a hinged base 28 for providing access to the lower interior of the second trash receptacle 16. The hinged base 28 includes a latch 30 for securing the hinged base 28 in a closed position.

Figure 3:
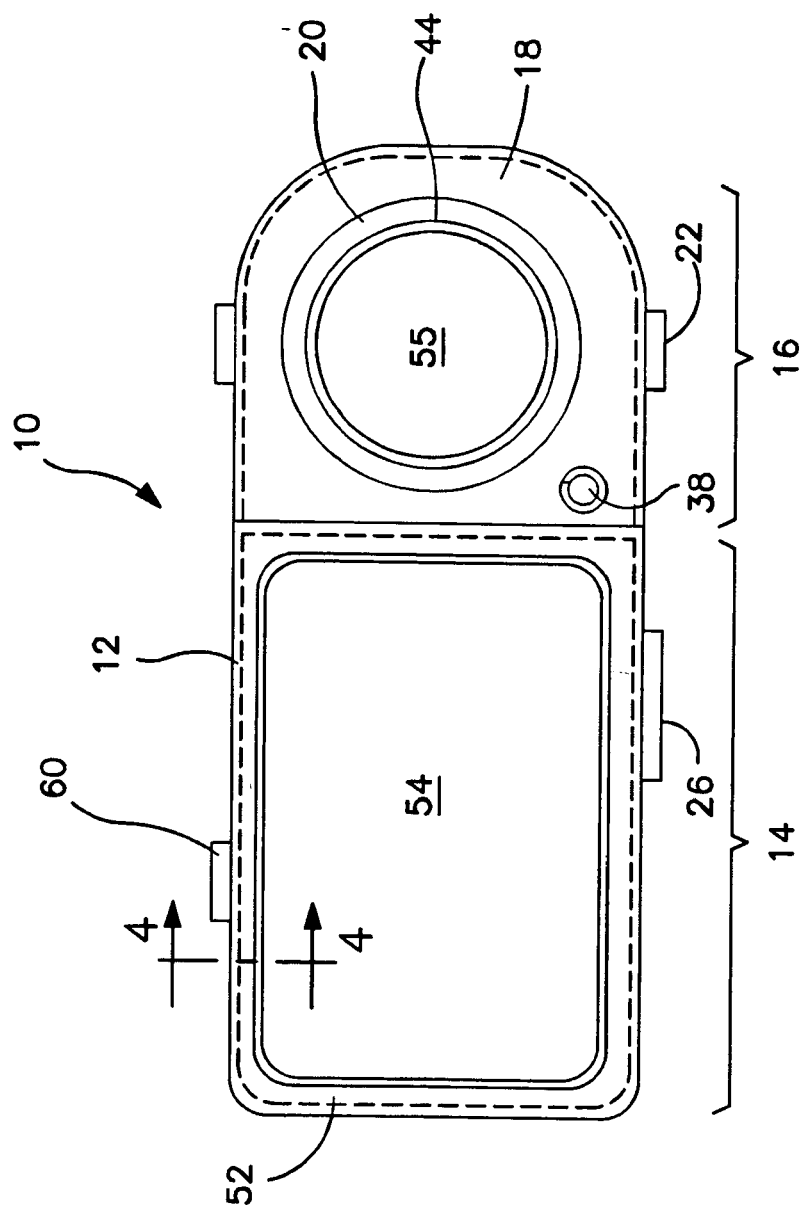
FIG. 3 is a top plan view of the embodiment of the present invention as shown in FIG. 1, wherein the cover has been removed.
Figure 5:
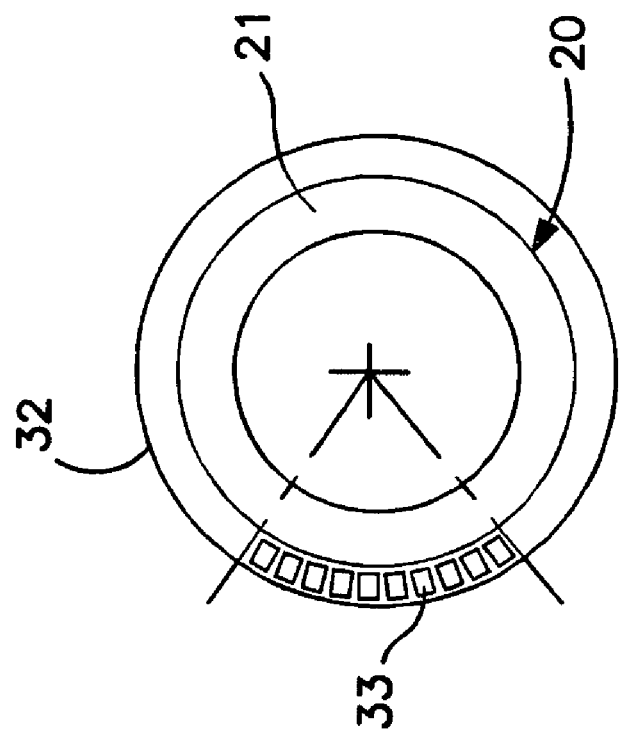
FIG. 5 is a top view of a tubing cassette having a drive plate attached to the bottom of the tubing cassette.

Referring to FIGS. 1 and 5, in one embodiment of the invention the tubing cassette 20 includes mounted on its base a drive plate 32. The drive plate 32 includes formed perforations 33 that extend 360 deg. around the drive plate 32 (only a portion of the perforations are shown in FIG. 5). The formed perforations 33 function as gear teeth. An electric drive motor and gear assembly 34 is mounted to the partition 17 in the interior of the first trash receptacle 14. An output shaft of the drive motor and gear assembly 34 rotate a sprocket 36, which engages the formed perforations 33 in the drive plate 32. The motor may be activated automatically, for example, when the hinged lid 24 is closed, or with a manual switch 38 (FIG. 3). The motor may remain powered for a predetermined amount of time or for a predetermined number of rotations of the tubing cassette 20. This drive arrangement is particularly useful when employed with a tube-twisting type tube-sealing device. Other means for rotating the tubing cassette 20 may be employed. For example, U.S. Publication No. US 2002/0162304 to Stravitz discloses a number of tubing cassette rotation mechanisms that may be utilized in the present invention. The contents of this publication are incorporated by reference herein.

Referring again to FIG. 2, a tube-twisting mechanism 40 is shown for twisting the tubing to close off packets of trash. Tube-twisting mechanism 40 includes a channel-shaped flange 42 that is located inside of and fixed to the container body 12, a tubing cassette 20 that rests on the channel-shaped flange 42, a rotatable collar 44 mounted to the tubing cassette 20, and a plurality of retention springs 50. The tubing cassette 20 has a tubular core, 46 and a continuous length of flexible tubing material 21 stored within the tubular core 46. An exemplary tubing cassette is disclosed in U.S. Pat. No. 4,934,529, the contents of which are incorporated by reference herein. Flexible tubing 21 is shown to extend from the top of the tubing cassette 20, over the rotatable collar 44, and through the center of the tubular core 46 of the tubing cassette 20. Trash packages 48 are shown formed at the free end of the flexible tubing 21 within the container body 12.

The retention springs 50 are attached to the channel-shaped flange 42 and retain or hold a trash package 48 stationary while the rotatable collar 44 is rotated to rotate the tubing cassette 20 to induce a twist in the flexible tubing 21. As used herein, the term "retention means" shall include any retention device for retaining a trash package 48 stationary while the flexible tubing 21 is rotated. The term shall include, for example, retention devices as disclosed in U.S. Pat. Nos. 4,869,049, 5,590,512, 6,170,240, 6,128,890, 6,370,847, JP 592039015 (P2000-247401 A), and U.S. Patent Publication No. US 2002/0162304, the contents of all of which are incorporated by reference herein.

In FIG. 3, there is shown a top view of an embodiment of the composite trash container 10 with the hinged lid 24 removed. As noted above, the composite trash container 10 includes a first trash receptacle 14 for non-odoriferous trash, and a second trash receptacle 16 for odoriferous trash. A rim 52 defines an opening 54 to the interior of the first trash receptacle 14. The inner lid 18, rotatable collar 44, and tubing cassette 20 define an opening 55 to the interior of the second trash receptacle 16. The hinged lid 24 (not shown) may include a latch-type hinge so it is conveniently retained in an open position when opened.

Figure 4:
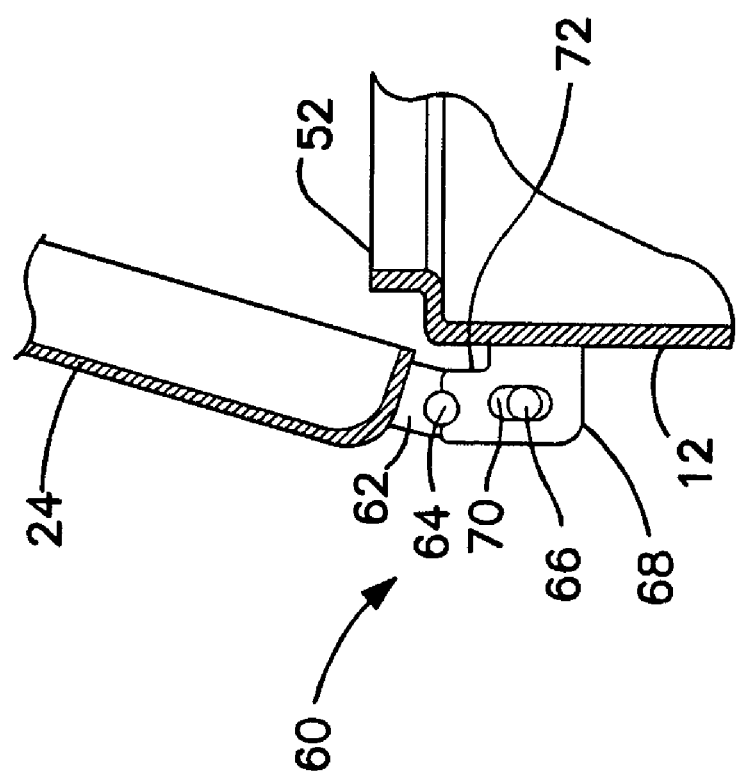
FIG. 4 is a sectioned side view of a latching hinge mechanism taken from FIG. 3.

In FIG. 4 (taken from FIG. 3), a latch-type hinge 60 is shown for retaining the hinged lid 24 in an open position when opened. The latch-type hinge 60 includes a pin plate 62 attached to the rear of the hinged lid 24. The pin plate 62 supports a latching pin 64 and a pivot pin 66. A hinge plate 68 is attached to the rear of the container body 12 and includes a slot 70 for receiving the pivot pin 66, and a shaped shoulder 72 for guiding the latching pin 64. The shaped shoulder 72 is configured to include a detent so that the latching pin 64 sits in the detent when the hinged lid 24 in the open position. Those of ordinary skill in the art will appreciate that other types of latch-type hinges may be used to provide the same convenience as the hinge shown in FIG. 4. Furthermore, a spring may also be used to retain the lid 24 in the open position.

Figure 6:
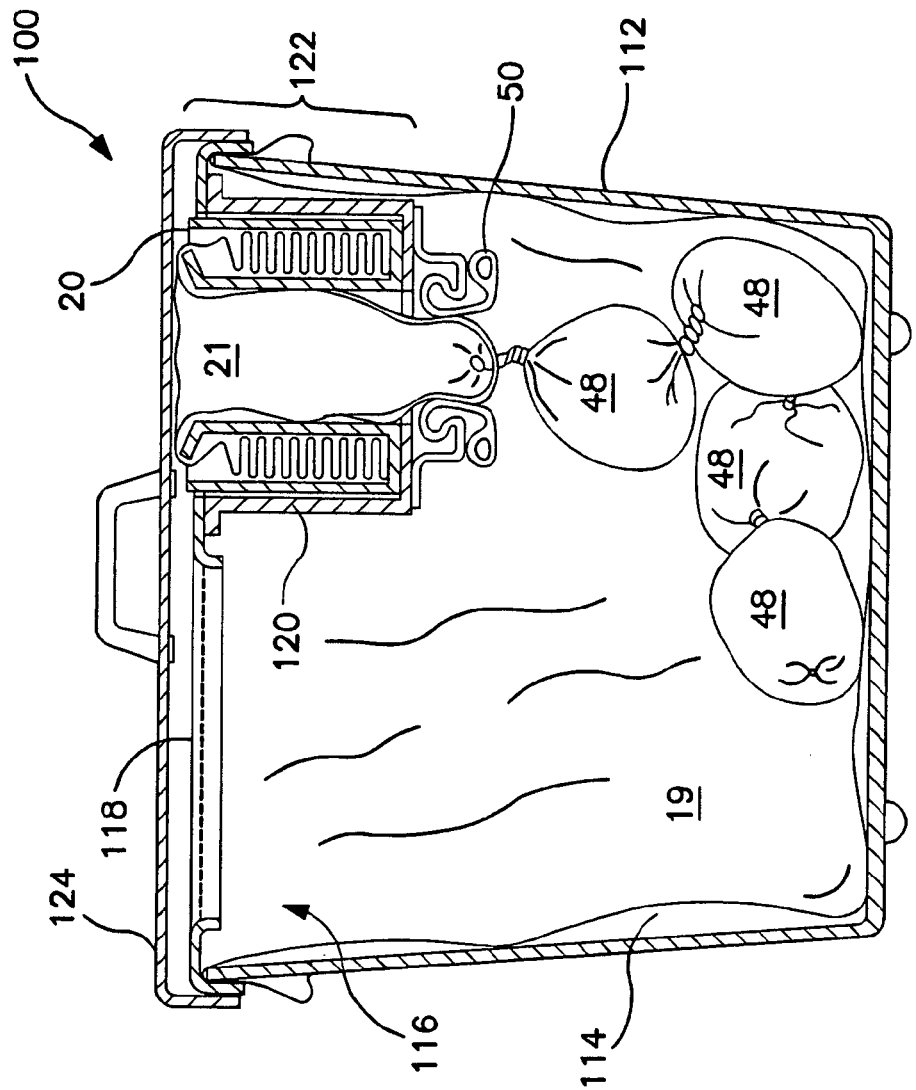
FIG. 6 is a sectioned front elevation view of an embodiment of the present invention.

In FIG. 6, a sectioned front elevation view of another embodiment of a composite trash container 100 is shown. In the embodiment a container body 112 defines a trash chamber 114 and an opening 116 that provides access to the trash chamber 114. An inner lid, or support, 118 is mounted to the container body 112 adjacent the opening 116. The support 118 includes a flange extending therefrom 120 that is configured for mounting a tubing cassette 20 above the trash chamber 114. The support 118 encloses less than all of the opening 116 to the trash chamber 114 so that trash can be passed through the opening 116 and into the trash chamber 114. The tubing cassette 20 is mounted to the flange 120 of the support 118. A tube-twisting mechanism is used as the tube-sealing means 122 for forming trash packets 48 from tubing 21 that is dispensed from the tubing cassette 20.

A trash bag 19 is mounted in the trash chamber 114. Trash packets 48 will collect in the trash bag 19 as the trash packets 48 are formed. Trash packets 48 are formed using the tube-twisting mechanism in a manner similar to that described above and with reference to the tube-twisting mechanism shown in FIG. 2. The twisting action may be by hand or a motorized mechanism may be employed. An outer lid 124 is hingedly attached to the container body 112 for enclosing the opening 116 to the trash chamber 114. As can be seen in the crosssectional views of FIGS. 1 and 6 of the exemplary embodiments, the tubing cassette 20 is eccentrically aligned with the container bodies 12 and 112, respectively.

Although the present invention and its advantages have been described in detail, it should be understood that various changes, substitutions and alterations can be made therein without departing from the spirit and scope of the invention as defined by the appended claims. For example, components in one figure can be combined with components shown in another figure.

What is claimed is:

1. A composite trash container, comprising:
   a container body defining a trash chamber and an opening that provides access to the trash chamber;
   a support mounted to the container body adjacent the opening, the support having a flange extending therefrom that is configured for mounting a tubing cassette above the trash chamber, wherein the support encloses less than all of the opening to the trash chamber so that trash can be passed through the opening and into the trash chamber;
   a tubing cassette mounted to the flange of the support and eccentrically aligned with said container body; and
   a tube sealing means for forming trash packets from tubing that is dispensed from the tubing cassette, wherein the tube sealing means causes the tubing cassette to rotate with respect to the tubing to form the trash packets.

2. A composite trash container as recited in claim 1, further comprising a trash bag mounted in the trash chamber in which trash packets will collect as they are formed.

3. A composite trash container as recited in claim 1, wherein the flange is configured so the tubing cassette can be rotated by hand to create a twist in the tubing when forming a trash packet.

4. A composite trash container as recited in claim 1, further comprising a partition mounted to the container body within the trash chamber that divides the trash chamber into a first trash chamber and a second trash chamber, and wherein the support positions the tubing cassette above the second trash chamber so that trash packets will collect in the second trash chamber as they are formed.

5. A composite trash container as recited in claim 1, wherein the tubing cassette is rotationally mounted to the flange, and further comprising a drive plate mounted to the tubing cassette, a drive gear drivingly engaged with the drive plate, and a motor mounted to the composite trash container and having an output shaft that rotates the drive gear when the motor is activated.

6. A composite trash container as recited in claim 5, wherein a timing circuit activates the motor to rotate the tubing cassette one of a predetermined amount of time or a predetermined number of times.

7. A composite trash container as recited in claim 5, further comprising a manually operated switch for activating the motor.

8. A composite trash container as recited in claim 1, further comprising a lid for enclosing the opening to the trash chamber.

9. A composite trash container as recited in claim 8, wherein the lid is hingedly attached to the container body.

10. A composite trash container, comprising:
    a container body defining a trash chamber and an opening that provides access to the trash chamber;
    a support mounted to the container body adjacent the opening, the support having a flange extending therefrom that is configured for rotational mounting of a tubing cassette above the trash chamber, wherein the support encloses less than all of the opening to the trash chamber so that trash can be passed through the opening and into the trash chamber;
    a tubing cassette rotationally mounted to the flange of the support and eccentrically aligned with said container body; and
    a retention means for preventing rotation of a trash packet when the tubing cassette is rotated to create a twist in the tubing.

11. A composite trash container as recited in claim 10, further comprising a trash bag mounted in the trash chamber in which trash packets will collect as they are formed.

12. A composite trash container as recited in claim 10, wherein the flange is configured so the tubing cassette can be rotated by hand to create a twist in the tubing when forming a trash packet.

13. A composite trash container as recited in claim 10, further comprising a partition mounted to the container body within the trash chamber that divides the trash chamber into a first trash chamber and a second trash chamber, and wherein the support positions the tubing cassette above the second trash chamber so that trash packets will collect in the second trash chamber as they are formed.

14. A composite trash container as recited in claim 10, further comprising a drive plate mounted to the tubing cassette, a drive gear drivingly engaged with the drive plate, and a motor mounted to the composite trash container and having an output shaft that rotates the drive gear when the motor is activated.

15. A composite trash container as recited in claim 14, wherein a timing circuit activates the motor to rotate the tubing cassette one of a predetermined amount of time or a predetermined number of times.

16. A composite trash container as recited in claim 14, further comprising a manually operated switch for activating the motor.

17. A composite trash container as recited in claim 10, further comprising a lid for enclosing the opening to the trash chamber.

18. A composite trash container as recited in claim 17, wherein the lid is hingedly attached to the container body.

19. A composite trash container, comprising:
a container body defining a trash chamber and an opening that provides access to the trash chamber;
a support mounted to the container body adjacent the opening, and configured to enclose less than all of the opening to the trash chamber so that trash can be passed through the opening and into the trash chamber;
a tubing cassette rotationally mounted to the support above the trash chamber and eccentrically aligned with said container body; and
a retention means for preventing rotation of a trash packet when the tubing cassette is rotated to create a twist in the tubing.

20. A composite trash container as recited in claim 19, wherein the tubing cassette can be rotated by hand to create a twist in the tubing when forming a trash packet.

* * * * *